US008695481B2

(12) United States Patent
Carbonini

(10) Patent No.: US 8,695,481 B2
(45) Date of Patent: Apr. 15, 2014

(54) HOT WATER SUPPLYING DEVICE FOR COFFEE MACHINES

(75) Inventor: Carlo Carbonini, Villastanza di Parabiago (IT)

(73) Assignee: Rancilio Group SPA, Milan (IT)

( * ) Notice: Subject to any disclaimer, the term of this patent is extended or adjusted under 35 U.S.C. 154(b) by 780 days.

(21) Appl. No.: 12/531,029

(22) PCT Filed: Mar. 5, 2008

(86) PCT No.: PCT/IB2008/050791
§ 371 (c)(1),
(2), (4) Date: Sep. 11, 2009

(87) PCT Pub. No.: WO2008/110961
PCT Pub. Date: Sep. 18, 2008

(65) Prior Publication Data
US 2010/0043647 A1    Feb. 25, 2010

(30) Foreign Application Priority Data
Mar. 13, 2007  (EP) ................................. 07425142

(51) Int. Cl.
*A47J 31/00*  (2006.01)
(52) U.S. Cl.
USPC .............. 99/279; 99/280; 99/300; 99/323.3
(58) Field of Classification Search
USPC ........ 99/279, 280, 281, 291, 293, 294, 323.3, 99/300
See application file for complete search history.

(56) References Cited

U.S. PATENT DOCUMENTS

| 5,584,229 | A  | * | 12/1996 | Anson ............................ 99/280 |
| 5,975,365 | A  |   | 11/1999 | Hsieh |
| 6,240,829 | B1 | * | 6/2001  | McGarrah ....................... 99/275 |
| 7,654,191 | B2 | * | 2/2010  | Greenwald et al. ............. 99/275 |

(Continued)

FOREIGN PATENT DOCUMENTS

DE     298 14 318 U1    1/1999
EP     0 339 292 A1     11/1989

(Continued)

*Primary Examiner* — William Pierce
(74) *Attorney, Agent, or Firm* — Sughrue Mion, PLLC

(57) ABSTRACT

The present invention relates to a hot water supplying device for coffee machines comprising a condensation chamber having at least one output duct for supplying the hot water, a first duct having a first flow rate and arranged for injecting water or steam at a first temperature into the chamber, a second duct having a second flow rate and arranged for injecting water at a second temperature into the chamber. According to the invention, the device further comprises first interception means (21) applied to the first duct (12) and arranged for supplying a first certain amount of water on the basis of the first flow rate by intercepting or not intercepting water injection by respective first time periods of interception or not interception in a certain time interval and second interception means (31) applied to the second duct (13) and arranged for supplying a second amount of water, calculated on the basis of the second flow rate, by intercepting or not intercepting the water injection by respective second time periods of interception or not interception in the certain time interval. The invention relates also to a method for supplying hot water with a device for a coffee machine, to a computer program product loadable in the memory of a computer for realising the method according to the invention and to a coffee machine that comprises the device.

11 Claims, 2 Drawing Sheets

(56) References Cited

U.S. PATENT DOCUMENTS

| | | |
|---|---|---|
| 7,673,557 B2 * | 3/2010 | Bienvenu et al. ............... 99/291 |
| 7,681,491 B2 * | 3/2010 | Agon et al. ..................... 99/293 |
| 8,037,811 B2 * | 10/2011 | Bunn ............................. 99/280 |
| 8,048,460 B2 * | 11/2011 | Ramus ........................... 426/231 |
| 8,127,662 B2 * | 3/2012 | Nijboer et al. .................. 99/275 |
| 2003/0126993 A1 * | 7/2003 | Lassota et al. .................. 99/279 |
| 2006/0016345 A1 * | 1/2006 | Paloheimo ..................... 99/279 |
| 2006/0042470 A1 | 3/2006 | Anson |

FOREIGN PATENT DOCUMENTS

| | | |
|---|---|---|
| EP | 1 354 543 A1 | 10/2003 |
| FR | 2 683 135 A1 | 5/1993 |
| FR | 2 692 129 A1 | 12/1993 |

* cited by examiner

HOT WATER SUPPLYING DEVICE FOR COFFEE MACHINES

TECHNICAL FIELD

The present invention relates to a hot water supplying device for coffee machines, for instance for espresso coffee machines.

In particular, the present invention relates to a device arranged to supply hot water for the preparation of beverages like teas, camomiles, infusions, tisanes, etc.

BACKGROUND ART

It is known that the preparation of beverages like teas, camomiles, infusions, tisanes, etc. requires to supply hot water that must be at a certain temperature for obtaining an optimal result.

For instance it is known that for a common black tea the temperature of water must be comprised, depending on the type of tea, between 85° and 100° C., that for Chinese green tea the temperature must be comprised between 80° and 90° C., that for Japanese green teas the temperature must be comprised between 75° C. and 85° C. while in the case of infusions, the temperature must be higher than that as required for the preparation of the various types of tea.

It is also known that, typically, machines for coffee preparation, for instance espresso coffee machines, comprise so-called hot water services, typically provided for by suitable devices arranged to supply hot water for the preparation of hot beverages by making direct or indirect use of a boiler comprised in the machine for generating overheated pressurised steam.

In particular, in the field of coffee machines the most common hot water supplying devices (devices) are of three types.

A first type of device provides that espresso coffee machines comprise a hot water tank and that they make use of the water therein contained, normally used for espresso coffee preparation, also for supplying the hot water service (h.w. service) by means of a suitable dispenser.

Such a type of device allows, typically, to supply hot water at temperatures comprised between 85°-95°, i.e. temperatures optimised for espresso coffee preparation but not optimised for preparation of hot beverages.

As a matter of fact, being the hot water tank provided for both, for the espresso coffee preparation and for the h.w. service supply, the two functions use the same temperature setting that, therefore, obviously, privileges the requirements for preparing espresso coffee.

Moreover, since, when the hot water service is supplied, the level of the liquid in the tank is restored by introducing cold water, very frequently the problem arises of high temperature oscillations internally to the single tank; indeed the amount of water supplied for the preparation of the beverages is very high, for instance equal or higher than half a liter of hot water in a short time, with the consequent result that the beverage preparation is negatively affected.

As a matter of fact, the thermal oscillations caused by the h.w. service supply are very heavy, if compared with those generated by the coffee supply, that for its nature provides to supply much lower amounts (50-100 cc of hot water for each coffee), and having long times of supply (15-25 second).

Such a type of h.w. service, therefore, is not very stable and not optimised to supply hot water at temperatures being optimised for the type of beverage to be prepared.

A second and a third type of device provides to use the pressurised water contained into the boiler both for the supply of overheated steam and for the supply of the hot water service, by means of a suitable dispenser.

For instance, the second type of device provides to directly use the boiler water.

In such a type of device the h.w. service is supplied at a very high temperature; therefore when the water reaches the outside of the dispenser, it partly cools down to 100° C., partly condenses and partly disperses into the atmosphere as water vapour.

Therefore the hot water supply with such a type of device, in addition to not being pleasant as it produces an actual "jet" output with spurting all around, it also involves the need for water at very high temperature which is not optimised for preparation of different hot beverages.

The third type of device provides to mix or condense in a condensation chamber the overheated and pressurised water of the boiler and cold water.

Such a type of device is for instance described in patent EP0339292B1 in the name of Applicant.

In the known device, the pressurised hot water of the boiler is mixed to a pre-determined cold water flow rate coming from a suitable duct.

In this way the "jet" of water is avoided because the condensation of the overheated steam occurs inside the device and not at the output of the dispenser.

In the known device, on the cold water duct, a "metering rod" is also provided, configured for regulating the flow of the cold water into the condensation chamber and in this way regulating the temperature of water coming out from the device (the overheated water of the boiler has a temperature of 115-140° C., depending on the regulations and on the equipment type).

In the known device it is provided that the regulation of the cold water flow is carried out mechanically, by means of a screwdriver, by rising and lowering the "rod" so as to differently throttle the cold water duct.

However such regulation possibility is very complex and difficult as it requires mechanical type operations the effect of which on temperature values of the supplied water is not easily foreseeable; due to this complexity it is provided, in practice, that the regulation of the "rod" and consequently of the hot water service temperature is carried out during installation or maintenance of the machine or device.

Therefore, a problem of said background art is that the supplying temperature of the hot water service is, typically, predetermined and that it is difficult if not impossible, when the type of beverage changes, to modify the temperature of the water upon supplying.

The Applicant has in short detected that, in view of the need for devices arranged to supply the hot water service by controlling the water temperature when the type of beverage to be prepared changes, all the known devices have the problem of not being able to allow to regulate simply and quickly, upon supplying, the temperature of the water that has to be supplied.

It is therefore clear that, desiring to meet the above demand, it is necessary to provide a device that overcomes the above stated problems of the background art.

DISCLOSURE OF THE INVENTION

Object of the present invention is a hot water supplying device for coffee machines apt to overcome the problems of the background art.

Such an object is achieved by means of a hot water supplying device for coffee machines as claimed.

The present invention also relates to a method for supplying hot water with a coffee machine as well as to a computer program product loadable in the memory of at least one computer and including software code portions for performing the steps of the method of the invention when the product is run on at least one computer. Reference to "at least one computer" is meant to highlight the possibility for the method of the invention to be carried out in a decentralised and/or modular manner over a plurality of computers.

Claims are an integral part of the teaching of the present invention.

According to a feature of a preferred embodiment, the device according to the invention comprises a first duct for introducing water or steam at a first temperature, a second duct for introducing water in a condensation chamber at a second temperature that is much lower than the first temperature, a supplying duct for supplying the hot water, and interception elements associated to the first and second duct and arranged for introducing or not the water in the chamber over respective time periods in a certain time interval so as to obtain a certain amount of hot water supplied in said certain time interval.

According to a further feature of the present invention, the device comprises a control unit configured for commanding the interception elements on the basis of supplying parameters as, for instance, temperature and amount of hot water to be supplied, selected by means of a command unit associated to the control unit.

According to another feature of the present invention, the device also comprises a parameter setting unit configured for storing working parameters in the control unit as, for instance, first and second water temperature, parameters associated to the interception elements and/or flow rate parameters.

BRIEF DESCRIPTION OF DRAWINGS

These and further features and advantages of the present invention will appear more clearly from the following detailed description of preferred embodiments, provided by way of non-limiting examples with reference to the attached drawings, in which components designated by same or similar reference numerals indicate components having same or similar functionality and construction and wherein.

BEST MODE FOR CARRYING OUT THE INVENTION

Figure 1:
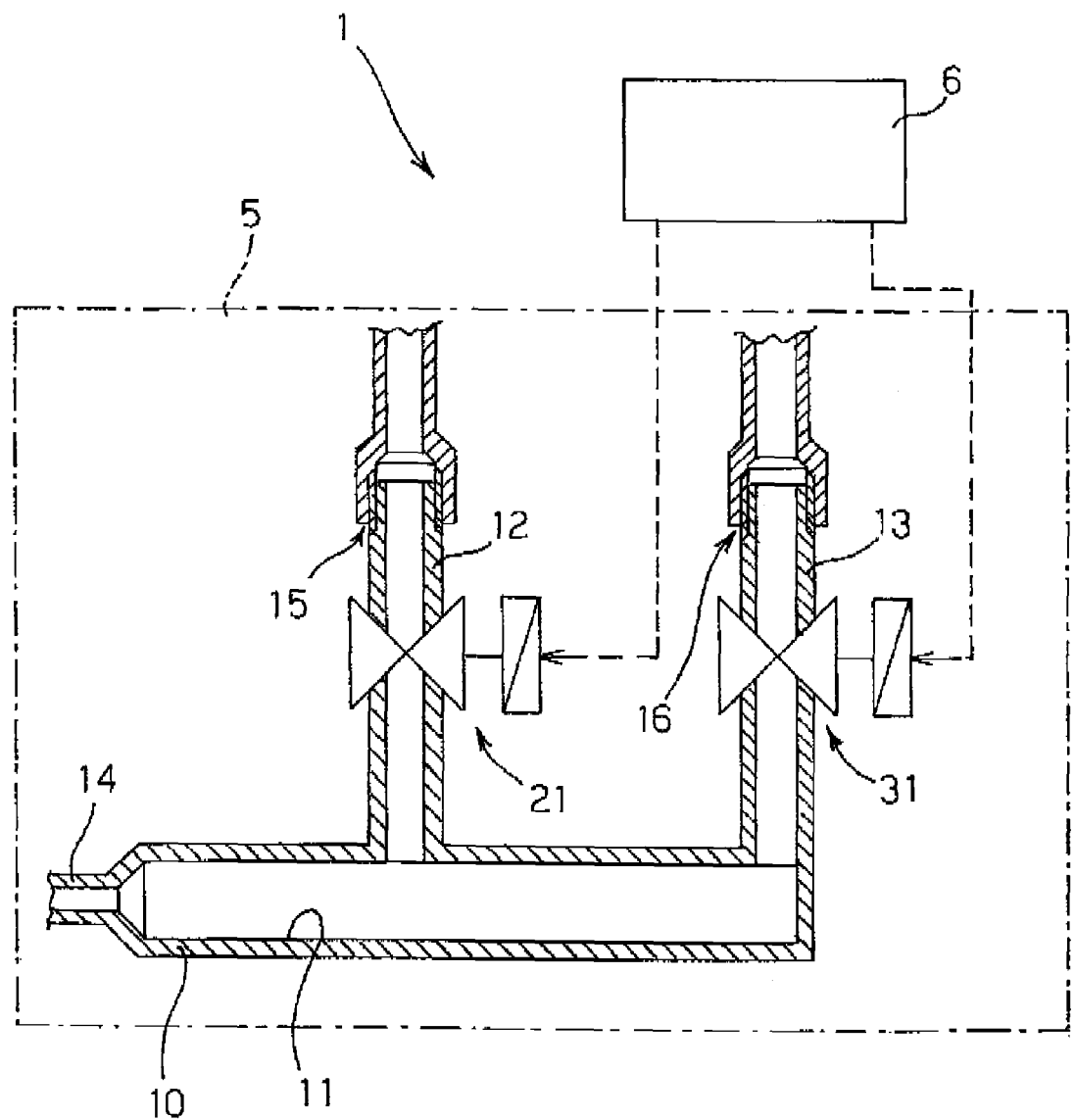
FIG. 1 schematically shows a hot water supplying device.

With reference to FIG. 1, the hot water supplying device (device) 1, according to a preferred embodiment, comprises a water injection and supplying assembly or unit (water service) 5 and a control assembly or unit (control unit) 6.

The water service 5 comprises a tubular body 10 having inside a cavity configured so as to realise a condensation chamber 11.

In the chamber 11 a pair of input ducts is provided, a first 12 and a second duct 13 respectively, and an output duct 14. In the preferred embodiment it is provided that the first duct 12 is arranged to inject hot water or steam into the chamber 11 and that the second duct 13 is arranged to inject cold water thereinto.

Preferably the first duct 12 is provided downstream of the second duct 13.

Figure 2:
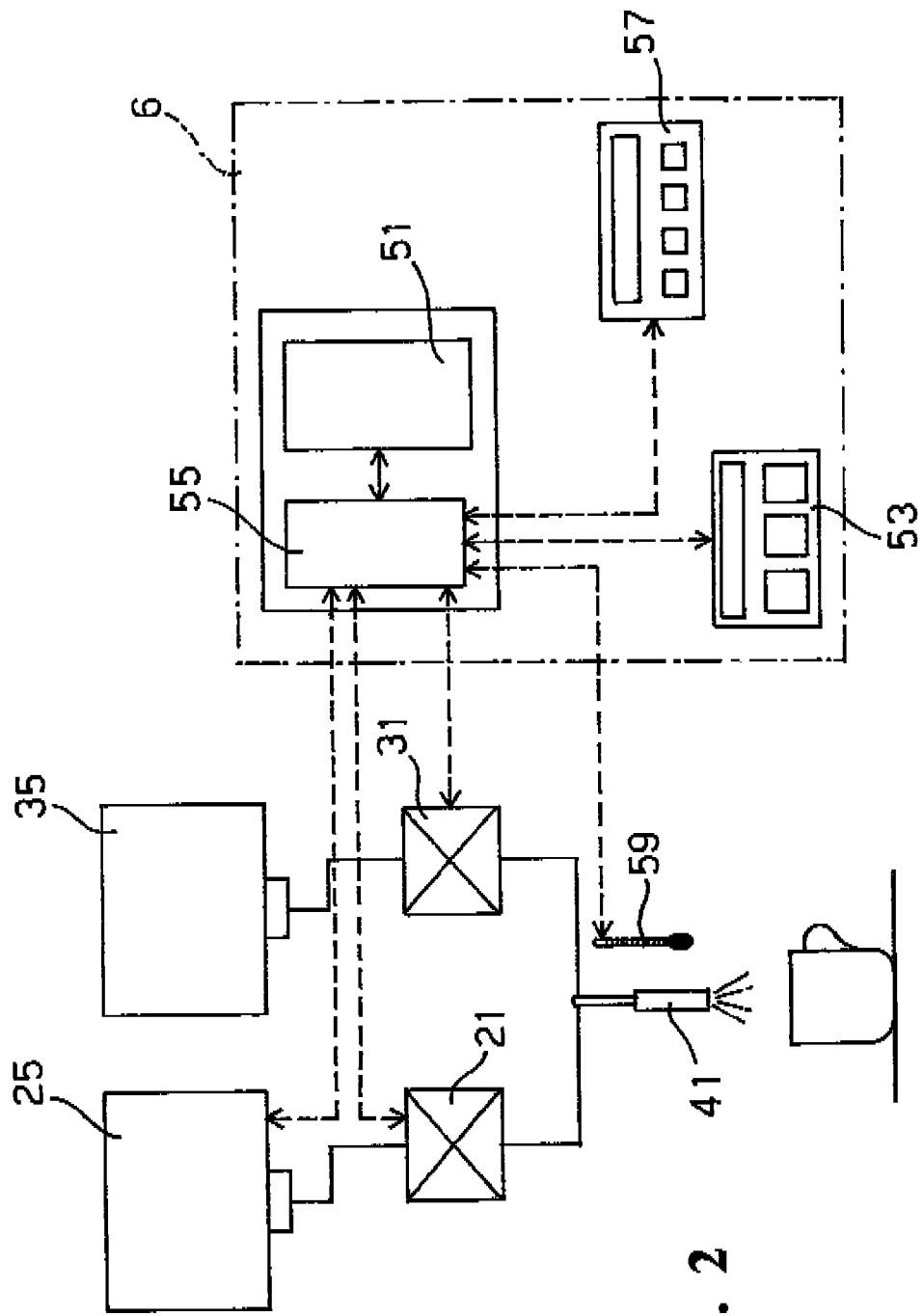
FIG. 2 shows a logic diagram of the device of FIG. 1.

The first duct 12, having for instance a 6 mm inner diameter, is associated or connected to a first pipe fitting 15 arranged to connect the duct 12 to a steam source 25 (FIG. 1, FIG. 2), for instance a boiler of an espresso coffee machine, of known type, containing, for instance, pressurised overheated water at temperatures comprised between 115 and 140° C.

The second duct 13, having for instance a 4 mm inner diameter, is associated or connected to a second pipe fitting 16 arranged to connect the second duct 13, in a known way, indirectly by means of a pump or directly, to a cold water source (source) 35, known per se, arranged to supply, for instance, water at a 20° C. temperature.

The output duct 14 is associated or connected to a nozzle 41 of known type arranged in the coffee machine, preferably, in a visible sight position.

In the preferred embodiment, interception elements or means, 21 and 31 respectively, for instance electromagnetic valves of known type, are applied or associated to the pair of input ducts, 12 and 13 respectively, and arranged to intercept hot and cold water injection under the control of the control unit 6, as it will be disclosed later on in detail.

The interception elements (electromagnetic valves or valves), 21 and 31, whose inner cross-sections have for instance 3.5 and 2.5 mm diameter respectively, are arranged to be opened and closed for certain time periods so as to activate intermittently, the injection of hot and cold water into the chamber 11, by means of ducts, 12 and 13 respectively.

The control unit 6 comprises, preferably, a micro-controller 51 of known type, for instance the MB90F497G micro-controller by FUJITSU Company, connected or including an Input Output interface (I/O interface) 55 having a plurality of ports; the control unit 6 also comprises a command unit 53, for instance a keyboard associated to a display, connected to the I/O interface 55, and arranged to command selection of supplying parameters and the supply of hot water for preparation of beverages by means of the water service 5.

For instance, the command unit 53 is arranged both to set or select, as supplying parameters, different values of supplying temperature, of amounts of water to be supplied, of supplying mode, for instance slow or fast, and to command activation or interruption of water supply.

Control unit 6 is connected in a known way, through the I/O interface 55, to the pair of valves, 21 and 31 respectively, and to the steam source (boiler) 25 and is arranged to control the operation thereof.

In particular, in the preferred embodiment, the control unit 6 is arranged to detect the values of pressure of the steam and/or of temperature of the water inside the boiler 25 and to control their values on the basis of parameters stored in the micro-controller 51; the control unit, moreover, is also arranged to control, in a known way, the cold water injection into the boiler 25.

Preferably it is provided that the control unit 6 of device 1 comprises a parameter setting unit 57, for instance a keyboard associated to a display of known type, connected in a known way to the I/O interface 55 and configured for allowing to set and store working parameters of the device 1, for instance in micro-controller 51.

Obviously, in other embodiments the parameter setting unit 57 can be an optional unit to be used during factory assembling or during maintenance for setting and storing working parameters in the micro-controller 51.

In still other embodiments the same command unit 53 can be configured, on the basis of programs developed during the design of device 1, so as to operate both in a command mode and in a parameter setting mode.

Preferably, it is also provided that device 1 comprises a temperature detecting component 59, for instance a temperature sensor or thermometer fixed, for instance, to the nozzle 41, connected, in a known way, to the I/O interface of the control unit 6 and arranged to transmit, at each time, to the micro-controller 51 signals indicating the temperature of the water supplied.

Such an embodiment allows, as it will be disclosed later on in detail, to control dynamically, by means of control unit 6 and valves, 21 and 31 respectively, the temperature of the supplied water.

Obviously, in other embodiments the temperature reading component (thermometer) 59 can be missing.

Control unit 6, as described, is arranged to control the operation of device 1 by means of programs developed during the design phase of the device and stored, for instance, in the micro-controller 51.

In particular, the control unit 6 is configured so as to control each valve, 21 and 31 respectively, to activate intermittent water supply in the form of alternate logic states, on the basis of programs developed during the design of the device and stored, for instance, in the micro-controller 51.

For example, the control unit, according to the present exemplary embodiment, is arranged to control valve 21 to assume ON state, in which for instance the valve remains open (on) for a TH-on period, and OFF state, in which for instance the valve remains closed (off) for a TH-off period.

By taking as reference a predetermined time interval Ttot corresponding to the sum of one or more periods TH-on and TH-off, the control unit, according to the present exemplary embodiment, is arranged to command valve 21 so that a useful working cycle for supplying hot water (Hot Water Duty Cycle or HDC) may be defined by means of the following expression:

$$HDC = \Sigma THi\text{-on}/\Sigma(THi\text{-on} + THi\text{-off});$$

wherein
i is a number comprised between 0 and, for instance, the maximum number of commands to open the valve in the Ttot interval.

According to the present exemplary embodiment the periods THi-on and THi-off may be of different length so that the amount of water supplied during the Ttot interval may be diversified by extending, for instance, the THi-on opening period of valve 21 with respect to the THi-off closing period.

Still more preferably, it is provided that the Ttot interval is divided into a plurality of cycles of constant length, each cycle (sum cycle) having a length, for instance, of 1 second and comprising the sum of a THi-on opening period and of a THi-off closing period, wherein one of such periods can vary from a null length to a length equal to the cycle length and the other period vice-versa.

Obviously the length of each cycle can be a predefined parameter or a parameter settable in the micro-controller 51.

In a way similar to that provided for valve 21, control unit 6 is arranged to control second valve 31 to assume state ON, in which the valve for instance remains open for a TC-on period, and state OFF, in which the valve for instance remains closed for a TC-off period.

A useful working cycle for supplying cold water (Cold Water Duty Cycle or CDC) may be defined by means of the following expression:

$$CDC = \Sigma TCi\text{-on}/\Sigma(TCi\text{-on} + TCi\text{-off});$$

wherein
i is a number comprised between 0 and, for instance, the maximum number of commands to open the valve 31 in the Ttot interval.

Also for the second valve 31, periods TCi-on and TCi-off may be of different length so that the water amount supplied during the Ttot interval may be diversified by extending, for instance, the TCi-on opening period of valve 31 with respect to the TCi-off closing period.

Also in the case of second valve 31, it is provided that the time interval division is carried out by dividing the Ttot interval in a plurality of cycles of constant length, each cycle (sum cycle) comprising the sum of a TCi-on opening period and of a TCi-off closing period, wherein one of such periods can vary from a null length to a length equal the cycle length and the other period can vary vice-versa.

Calculation of cycles HDC and CDC, according to the present exemplary embodiment, is carried out by the control unit 6, following commands activated by the command unit 53, on the basis of working parameters stored, for instance, in the micro-controller 51.

In particular, in the preferred embodiment it is provided that, in addition to programs, working parameters are stored in micro-controller 51 including, for instance:

Water or steam temperature (TEMPH) into the boiler 25;

Hot water flow rate (PH) into first duct 12 or an equivalent parameter arranged to allow calculation of such flow rate;

Cold water temperature (TEMPC) at source 35;

Cold water flow rate (PC) into second duct 13 or an equivalent parameter arranged to allow calculation of such flow rate;

The possible shortest opening or closing period ($\Delta$ion, $\Delta$ioff) that can be managed by the installed valves, for instance 0.1 seconds;

The length of a possible opening and closing sum cycle ($\Delta$on–off) of each valve, 21 and 31 respectively, for instance one second or two seconds.

On the basis of the above parameters it is therefore possible for the micro-controller 51 of control unit 6 to calculate, for instance according to a certain amount of water to be supplied and a certain target temperature of the water, the Ttot interval and the correspondents cycles HDC and CDC.

For example, the Applicant has experimentally noticed that with source water at 20° C., hot water at 120° C. and water flow rates calculated on the basis of the proposed ducts dimensions, it may be obtained:

a water temperature of 75° C. by using HDC=50% and CDC=100%;

a water temperature of 85° C. by using CDC=HDC=100%;

a water temperature of 90° C. by using HDC=100% and CDC=50%.

By way of an "extreme" example it is possible to obtain:

a water temperature of 100° C. by using CDC=0% and HDC=100%;

a water temperature equal to that of the water system, for instance 20° C. by using CDC=100% and HDC=0%.

Obviously, in the above examples 100% working cycles imply uninterrupted supply of water in the Ttot interval and 0% working cycles imply no water supply in the Ttot interval.

The operation of the supplying device 1, as described above is the following.

Subsequent to the selection by an operator or a user (operator), by means of the command unit 53, for instance, of a certain temperature (TW) and of a certain amount of water to be supplied (VW), the micro-controller 51, on the basis of the programs developed during the design of device 1 and of the parameters stored in it, performs, preferably, the following operations:

it calculates the amount of hot water (VH) and of cold water (VC) to be supplied for obtaining the selected amount VW and temperature TW;

it calculates, depending on the flow rate of each duct, PH and PC, respectively, the supply time interval necessary for supplying amounts VH and VC respectively and sets, preferably, as Ttot, the longest time interval among the calculated ones, or a longer time interval, in the case a slow supply is set;

it calculates, on the basis of the shortest opening or closing period ($\Delta$ion, $\Delta$ioff) and of the opening and closing cycle sum ($\Delta$on–off) of each valve, the working cycle HDC and CDC, respectively, and the corresponding periods of supplying and closing of at least one of the two valves, 21 or 31; obviously, in some particular cases both working cycles may be equal to 100%;

it supplies the water on the basis of calculated working cycles, for example following a suitable activation command by operator.

The described preferred mode of operation, allows to have second after second, as easily comprehensible to a technician in the field, a supplying temperature at the nozzle 41 corresponding to that selected, whereby any supplying interruption command does not affect the temperature of the water as supplied.

In such embodiments, advantageously, it is not necessary that the operator selects the total amount of water to be supplied.

As a matter of fact, as easily comprehensible to a technician in the field, it is sufficient that the micro-controller 51, on the basis of the programs realised and stored therein, sets a minimum reference amount, for instance 100 cm$^3$, and that it calculates, on the basis of such minimum reference amount, Ttot, HDC and CDC values, and that it repeats the working cycles until the operator commands the supplying interruption, for instance manually.

Moreover, according to such embodiments, it is also provided that the operator simply selects merely approximate temperature values, as for instance a high, medium or low supplying temperature, and that, depending on the selection made, the control unit commands the supply as disclosed according to the experimental example previously described.

In the above description and figures reference has been made up to now to the presence of two valves, 21 and 31, applied to the two input ducts, 12 and 13 respectively, and arranged to activate intermittently the hot and cold water injection into chamber 11.

In other embodiments it is provided to apply an interception element to one of the two input ducts by leaving the other input duct lacking in interception elements.

Such a solution, allows in any case to control the supply temperature of the water, by operating in intermittent way on only one of the two input ducts.

Obviously, in such embodiments it is also provided that, for instance, on the output duct an opening and closing valve is applied for activating the hot water supply and for deactivating it after a certain time interval, for instance an interval equal to Ttot or a time interval higher than the minimum interval suitable for obtaining the minimum reference amount, for instance 100 cm$^3$ as provided in the above example.

The opening and closing valve can be, as easily comprehensible to a technician in the field, an automatic type valve one controlled by control unit 6, or, even a manual type one.

According to still other embodiments, it is also provided that the micro-controller 51 of control unit 6 divides into parts the water supplied by at least one of the two ducts, 12 or 13 respectively, by activating an uninterrupted supply followed by an uninterrupted supply arrest until completion of the Ttot interval or viceversa.

Such a solution, as easily comprehensible to a technician in the field, ensures the selected temperature only at the end of the supply operation.

In still other embodiments, when thermometer 59 is present, it is provided that the microcontroller 51 of control unit 6 measures, second by second, the temperature of the supplied water and modifies, if necessary, the length of periods, THi-on, THi-off and/or TCi-on, TCi-off, depending on the supplying temperature set by the operator.

Advantageously, according to such an embodiment, possible differences in temperature, between the supplied water and that as set, due for instance to temperature changes of the source water, may be compensated by the micro-controller 51, by modifying dynamically the length of the THi-on periods, THi-off and/or TCi-on, TCi-off.

Still more advantageously, according to such an embodiment, the supply of the water at the selected temperatures may not require use of working parameters concerning the water temperature at the steam source 25 and at the cold water source 35 because the temperature values measured by thermometer 59 are sufficient for allowing the micro-controller 51 to dynamically modify length of periods THi-on, THi-off and/or TCi-on, TCi-off.

Of course, obvious changes and/or variations to the above disclosure are possible, as regards dimensions, shapes, materials, components, circuit elements, and connections, as well as details of circuitry, of the described construction and operation method without departing from the scope of the invention as defined by the claims that follow.

The invention claimed is:

1. A hot water supplying device for coffee machines, comprising:
   a condensation chamber having at least one output duct for supplying hot water;
   a first duct arranged for injecting water or steam at a first temperature and at a first flow rate into said chamber;
   a second duct arranged for injecting water at a second temperature much lower than the first temperature and at a second flow rate into said chamber;
   interception means applied to at least one of said ducts and arranged for supplying at least a certain amount of water, by intercepting or not intercepting the water injection through said at least one of said ducts by time periods of interception or not interception in a certain time interval of a working cycle;
   a control unit, including executable program logic, and connected to said interception means, to perform:
   calculating, on the basis of a minimum reference amount and of said first and second flow rate, said time periods of interception or not interception and said certain time interval of the working cycle on the basis of supply parameters comprising at least different temperature values of the water to be supplied by the output duct;
   commanding said interception means according to said calculated time periods of interception or not interception and said certain time interval of the working cycle;
   repeating said working cycle until a supply interruption is operated.

2. The device according to the claim 1,
   wherein said interception means comprises:
   first interception means applied to said first duct and arranged to be controlled in output by said control unit for managing the supply of the first amount of water by intercepting or not intercepting the water injection by respective first time periods of interception or not interception in said certain time interval; and
   second interception means applied to said second duct and arranged to be controlled in output by said control unit for managing the supply of said second amount of water by intercepting or not intercepting the water injection by respective second time periods of interception or not interception in said certain time interval.

3. The device according to claim 1 wherein said supply parameters comprise different amount values of the water to be supplied by the output duct.

4. The device according to claim 2 wherein said supply parameters comprise different amount values of the water to be supplied by the output duct.

5. The device according to claim 1 wherein said control unit including the program logic, further includes working parameters comprising at least one of the following values:
    said first temperature of water or steam;
    said second temperature of water.

6. The device according to claim 2 wherein said control unit including the program logic, further includes working parameters comprising at least one of the following values:
    said first temperature of water or steam;
    said second temperature of water.

7. The device according to claim 5 wherein said working parameters further comprise shortest values of said time periods of interception or not interception.

8. The device according to claim 5 wherein said control unit further performs setting said working parameters.

9. The device according to claim 1 wherein said control unit comprises:
    at least one processing unit;
    interface means connected to said interception means;
    command means connected to said interface means and arranged for commanding the supply of the water by selectively commanding said interception means.

10. The device according to claim 1 further comprising:
    a temperature sensor provided to said output duct for measuring the temperature of the supplied water and providing the measured temperature to said control unit for controlling the supply of said first and said second amount of water.

11. The device according to claim 1, wherein the coffee machine comprises a first water source and a second water source, and wherein a temperature sensor senses the temperature of each of the first water source and the second water source, which are stored in the supply parameters, and wherein the calculating step determines the time periods partially based on the sensed temperatures of the first water source and the second water source.

* * * * *